United States Patent [19]

Brickner, Jr.

[11] Patent Number: 4,694,721

[45] Date of Patent: Sep. 22, 1987

[54] MOTOR PACK FOR CIRCULAR SAW

[75] Inventor: Louis C. Brickner, Jr., Pittsburgh, Pa.

[73] Assignee: Delta International Machinery Corp., Pittsburgh, Pa.

[21] Appl. No.: 848,592

[22] Filed: Apr. 8, 1986

[51] Int. Cl.$^4$ .............................................. B27B 5/24
[52] U.S. Cl. .................................... 83/471.3; 30/388; 83/490; 83/581
[58] Field of Search .............. 83/574, 490, 581, 471.3; 30/388, 390, 391

[56] References Cited

U.S. PATENT DOCUMENTS

| | | | |
|---|---|---|---|
| 1,778,971 | 10/1930 | Dekoning | 83/490 |
| 2,208,582 | 7/1940 | Hollister | 83/471.3 |
| 2,252,112 | 8/1941 | Bailey | 83/471.3 X |
| 2,323,248 | 6/1943 | Sellmeyer | 83/471.3 |
| 3,538,967 | 11/1970 | Hensley | 83/471.3 X |
| 4,002,094 | 1/1977 | Erickson et al. | 83/471.3 |

FOREIGN PATENT DOCUMENTS 516205  2/1955  Italy ...................... 30/388

OTHER PUBLICATIONS

Delta 33-150 Sawbuck Frame & Trim Saw, (Parts List Revised 1-15-86).
Rockwell International (Delta) 34-010 Motorized Miter Box, (Parts List Revised 6/15/77; Parts List Revised 3/1/78; Instruction Manual).

Primary Examiner—Frank T. Yost
Attorney, Agent, or Firm—Merchant, Gould, Smith, Edell, Welter & Schmidt

[57] ABSTRACT

Method and apparatus for providing motive power to a tool are disclosed. A preferred power mitre box (10) including a base (12), a table (14) and electrically-powered motor unit (18) suitable for driving a saw blade (20) is described. The motor unit (18) includes an armature (40) and an arbor shaft (22) which are respectively supported by armature bearings 42 and arbor bearings 44 and are preferably substantially parallel and of substantially the same length. Also, the distances between the armature bearings (42) and the arbor bearings (44) are preferably substantially equal. The relatively large distance between the arbor bearings (44) causes the blade (20) to have very little play or deflection due to looseness in the bearings (44). In preferred embodiments, a speed reducer assembly (34) is located on the opposite end of the arbor shaft (22) in relation to the blade (20). Also, the speed reducer assembly is preferably of the cog belt type.

24 Claims, 6 Drawing Figures

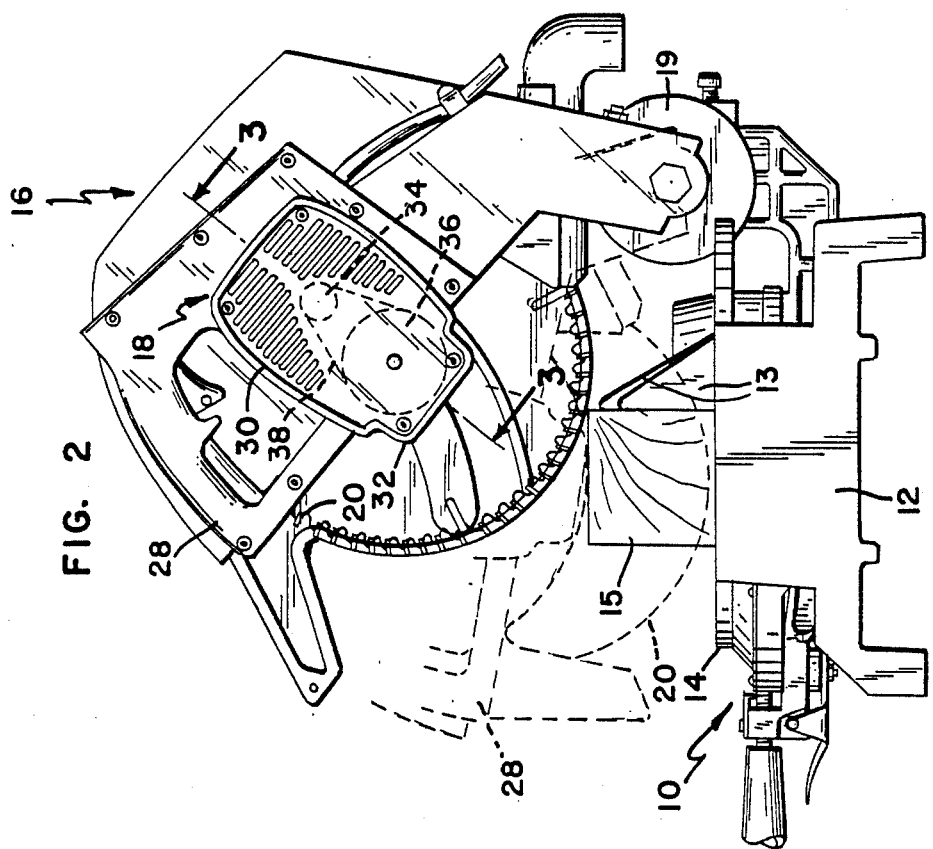
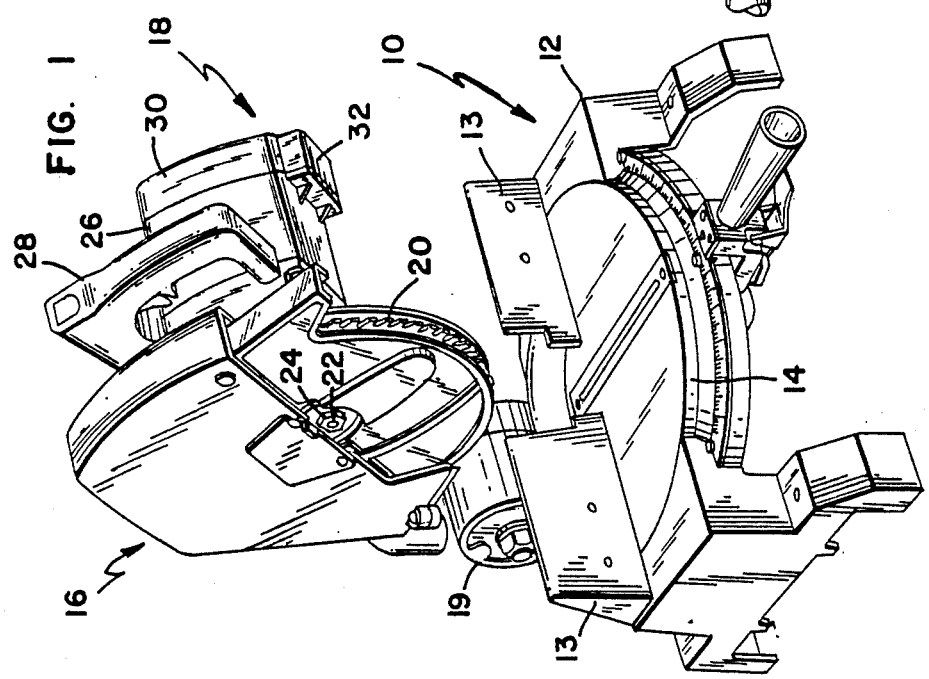

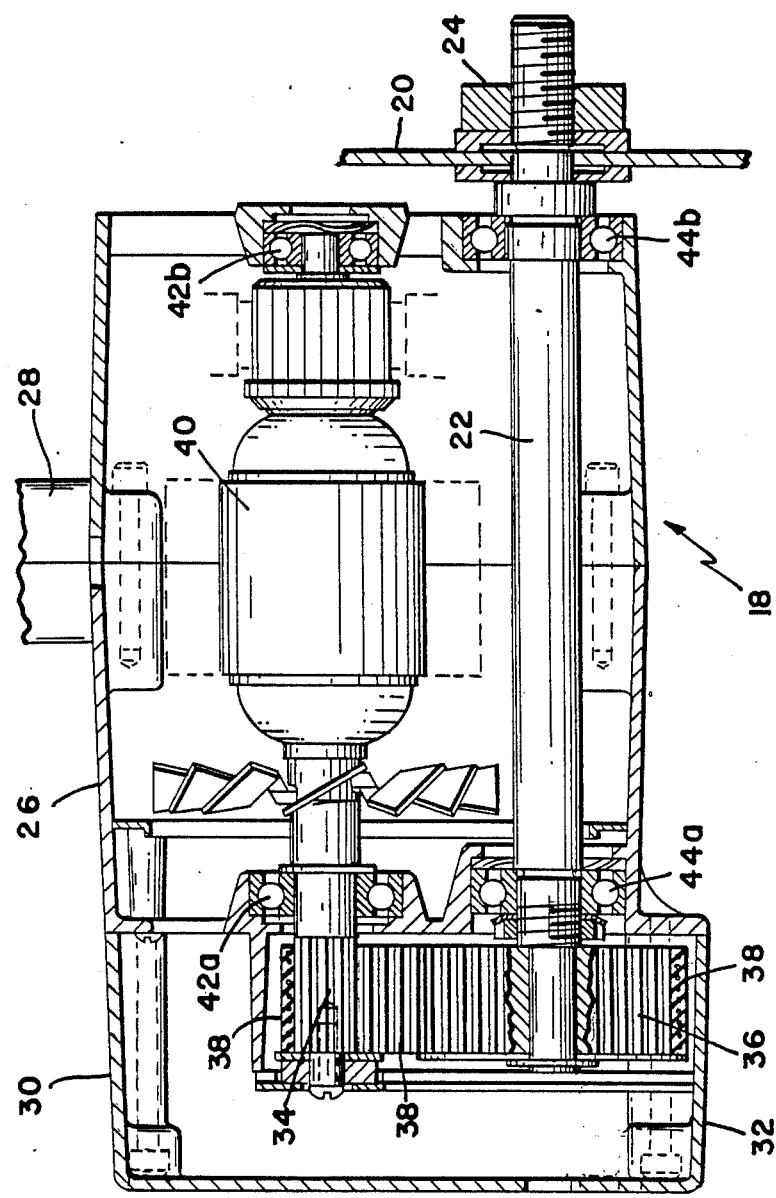

MOTOR PACK FOR CIRCULAR SAW

FIELD OF THE INVENTION

The invention relates generally to power tools, and more particularly to methods and means for providing motive power to power tools, e.g., saws and the like.

BACKGROUND OF THE INVENTION

Power tools, including power drills and saws of various types, have enjoyed widespread use. Electric power tools in particular are very popular. The present invention is directed generally to means for providing motive power to tools and tools incorporating such motive power providing means. The invention will be discussed in terms of electrically-powered saws, but it should be emphasized that the claims, not the following description, are indicative of the extent of the invention.

Several different types of electrically-powered saws are available, including radial-arm saws, table saws, circular saws and power mitre boxes. A preferred embodiment of the invention includes a motor unit for a power mitre box, and the remaining discussion will focus on power mitre boxes by way of example. The present invention is not limited to power mitre boxes in any way, however.

As is well known, a power mitre box is essentially a mitre box and a circular saw, in combination. The saw is vertically hinged to a table which can horizontally swivel in relation to a base. The angle of the table to the base determines the angle of the cut. A power mitre box can be used by a carpenter to quickly and accurately cut molding, for example, for subsequent installation in a house.

Power mitre boxes usually include an electric motor which operates at approximately 20,000 revolutions per minute (RPM). A speed reducer assembly mechanically couples the armature of the electric motor to an arbor shaft which carries the saw blade. The speed reducer assembly, either gear or belt type, reduces the speed of the arbor shaft to approximately 4,000 to 5,000 RPM. The electric motor, the speed reducer assembly, the arbor shaft, and their related components constitute a "motor unit," and the present invention is primarily directed to such a motor unit.

At a minimum, power mitre boxes should be:
1. reliable;
2. precise;
3. safe;
4. easy to repair; and
5. capable of efficiently cutting through lumber having a reasonably large cross-section with a single pass.

Of the desirable characteristics listed above, the present invention is primarily directed toward improving the preciseness of power mitre boxes. In preferred embodiments, ease-of-repair and cutting capability are also enhanced.

As noted above, improving the accuracy or preciseness of a power mitre box is one aspect of the invention. A power mitre box can render a clean, precise, vertical cut only if it is supplied with a sharp blade which is securely connected to a horizontally-rigid arbor shaft. Play or radial runout in the arbor shaft can lead to an imprecise cut. Referring to FIG. 5, play in the arbor shaft can result in movement of the saw blade away from the vertical such that the power mitre box will not make a precise vertical cut. FIG. 5B diagrammatically illustrates a typical prior art arbor shaft supported by a pair of closely spaced ball bearings. Looseness in the bearings necessarily allows play in the arbor shaft, and this effect is quite pronounced due to the close spacing of the ball bearings.

In addition to the arbor shaft play problem discussed above, prior art power mitre boxes typically include speed reducer assemblies which tend to limit their cutting capability (factor No. 5 set out above). As mentioned above, there are two types of speed reducers, gear and belt. In the case of a gear speed reducer, a pinion gear is mounted on the armature shaft. It meshes with and drives a larger diameter gear carried by the arbor shaft. In belt reducers, a small sprocket is attached to the armature, a larger diameter sprocket is mounted on the arbor shaft and a cog belt interconnects the two sprockets. In either case, the diameter of the relatively larger gear or sprocket necessarily limits the depth of cut provided by a given saw blade. That is, the motor unit casing surrounding the larger gear or sprocket comes into contact with the workpiece before the arbor shaft, thus limiting full utilization of the saw blade. Prior art power mitre boxes have short arbor shafts which locate the larger sprocket or gear in close proximity to the blade. The 37 bulge" in the motor unit casing associated with the larger gear or sprocket therefore comes into play during every cut (of thick lumber), and the entire radius of the blade is not utilized.

While most prior art power mitre boxes (and other power saw devices, for that matter) are useful for their intended purposes, it is perceived that they are lacking in some areas. In particular, arbor shaft deflection is unnecessarily large. Also, saw blades are often underutilized, at least for mitre or bevel cuts. Finally, the speed reducer assemblies of some prior art motor units are expensive to repair. The present invention is primarily directed toward reducing arbor shaft and blade deflection; and preferred embodiments address the blade utilization and speed reducer repair problems associated with prior art devices.

SUMMARY OF THE INVENTION

Accordingly, the present invention broadly includes an apparatus for providing motive power to a tool, including:
  (a) a casing;
  (b) an armature;
  (c) a pair of armature bearings operatively connected to the casing for rotatably supporting the armature;
  (d) an arbor shaft operatively coupled to the armature suitable for carrying the tool; and
  (e) a pair of arbor bearings operatively connected to the casing for rotatably supporting the arbor shaft, wherein:
    (i) the distance between the arbor bearings is at least approximately one-third the distance between the armature bearings;
    (ii) the distance between the arbor bearings is at least approximately one-half the tool diameter; or
    (iii) the length of the arbor shaft is at least approximately one-third the length of the armature.

Thus, the distance between the arbor bearings is increased such that any play in the bearings does not cause an unacceptable amount of play or deflection in the blade.

Preferably, the distance between the arbor bearings is at least as large as three-quarters the distance between the armature bearings. More preferably, the arbor shaft is approximately the same length as the armature and the arbor shaft bearings and armature bearings are approximately the same distance apart.

Addressing the blade utilization problem discussed above, preferably the apparatus includes a speed reducer assembly which is located at the end of the arbor shaft opposite from the end which carries the tool, e.g., the saw blade.

And, with respect to the ease-of-repair problem discussed above, the speed reducer assembly is preferably of the cog belt type as opposed to the gear type.

As mentioned above, the invention is primarily directed toward power mitre boxes, and, broadly stated, the invention includes a power mitre box suitable for providing motive power to a saw blade, including:

(a) a base;
(b) a table pivotably connected to the base; and
(c) a motor unit pivotably connected to the table, comprising:
 (i) a casing;
 (ii) an armature;
 (iii) a pair of armature bearings operatively connected to the casing for rotatably supporting the armature;
 (iv) an arbor shaft operatively coupled to the armature suitable for carrying the saw blade; and
 (v) a pair of arbor bearings operatively connected to the casing for rotatably supporting the arbor shaft, wherein the distance between the arbor bearings is at least approximately one-third the distance between the armature bearings.

Preferably, the power mitre box possesses the characteristics discussed above in connection with the motor unity of the invention. For example, a preferred power mitre box according to the invention has an armature and arbor shaft which are of substantially the same length and which have bearings separated by approximately the same distance.

BRIEF DESCRIPTION OF THE DRAWING

The present invention will be further described with reference to the Drawing, in which:

FIG. 1 is a perspective view of a power mitre box according to the present invention illustrating, among other things, a preferred motor unit;

FIG. 2 is a side elevational view of the power mitre box of FIG. 1;

FIG. 3 is a side cross-sectional view of the motor unit of FIG. 1, taken generally along line 3—3 of FIG. 2;

DETAILED DESCRIPTION OF THE PREFERRED EMBODIMENT

Figure 4:
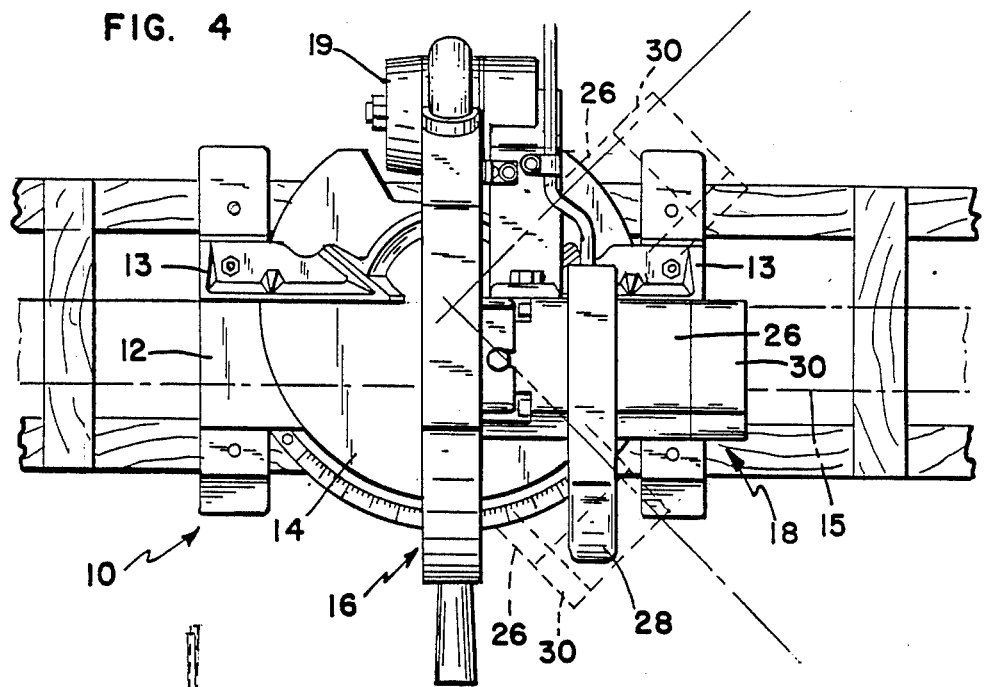
FIG. 4 is a top plan view of the power mitre box of FIG. 1, showing, in phantom, alternate positions of the table in relation to the base of the mitre box.

A preferred embodiment of the present invention will now be described with reference to the Drawing, wherein like reference numerals represent like parts and assemblies throughout the several views. FIG. 1 illustrates a preferred power mitre box 10 constructed according to the invention. The power mitre box 10 includes as its basic components a base 12, a table 14 and a power saw 16. The table 14 is designed to horizontally swivel relative to the base 12 and the power saw 16 is vertically hinged to the table 14, wherein a torsional spring unit 19 interconnects the saw 16 and the table 14. A fence 13 is connected to and extends perpendicularly upward from the top surface of the base 12. The fence 13 is stationary with respect to the base 12, but table 14 can freely rotate in relation to the fence 13.

Saw 16 includes as its basic components a power unit 18 and a blade 20. The blade 20 is secured to an arbor shaft 22 extending from the motor unit 18, and a nut 24 threads on arbor shaft 22 to safely secure the blade 20 thereto.

Referring to FIG. 2, a piece of wood 15 to be cut is placed against the vertical fence 13 and on the horizontal surface formed by base 12 and table 14. Once the wood 15 is in position, the power saw 16 is activated and vertically pivoted downward to make the cut.

Since it is desirable to make a vertical cut in wood 15, the blade 20 should preferably remain precisely perpendicular to the top surface of table 14 throughout the cut, regardless of the angle between the table 14 and the base 12. In view of this, it is clear that play in the arbor shaft 22 is undesirable.

Referring to FIGS. 1 and 2, the motor unit 18 primarily houses an electric motor, a speed reducer mechanism and the arbor shaft 22. A case 26 encloses these components and a handle 28 extends laterally from case 26 and provides a means for safely grasping the saw 16 to pivot it downward into the work.

On the end of case 26 opposite the blade 20 is a speed reducer cover 30. As further discussed below, this cover 30 encases a speed reducer mechanism which operatively couples the armature of the electric motor to the arbor shaft 22. Downwardly extending from the speed reducer cover 30 is a cover extension 32.

FIG. 2, is a side elevational view of the power mitre box 10, shows the speed reducer cover 30 and its lower portion, the cover extension 32. This view also shows, in dashed line, an armature sprocket 34, an arbor sprocket 36 and a cog belt 38 coupling the sprockets together. This view clearly illustrates the need for the cover extension 32: the arbor sprocket 36 has a diameter significantly larger than the diameter of armature sprocket 34 to achieve speed reduction. FIG. 2 also illustrates how the cover extension 32 interferes with full utilization of the blade 20. At least in the case of 90 degree cuts, as opposed to 45 degree mitres, for example, the cover extension 32 will come into contact with a fairly thick piece of lumber 15 before the blade 20 passes completely therethrough. However, in the preferred embodiment 10 illustrated in the Drawing, the speed reducer is horizontally displaced from the saw blade 20 so as to minimize the interference of cover extension 32 even in the case of a 90 degree cut. And, in the case of mitre cuts, the cover extension 32, by virtue of its being positioned at the opposite end of case 26 from the blade 20, does not interfere with the cutting process. This characteristic of the preferred power mitre box 10 is further discussed below with reference to FIG. 4.

FIG. 3 is a longitudinal cross-sectional view of the motor unit 18. Motor unit 18 preferably includes a universal series motor having an armature 40 supported by a pair of armature bearings 42a and 42b substantially at opposite ends thereof. The construction of armature 40 and the selection and use of armature bearings 42a and 42b are well known to those skilled in the art of electric motor design and require no further description. The universal series motor also includes conventional stator and brush mechanisms, shown in dashed line in FIG. 3.

One end of armature 40 extends into speed reducer cover 30 and carries the armature sprocket 34. Arbor sprocket 36, carried by arbor shaft 22, is also located within speed reducer cover 30. As shown in FIG. 2, arbor sprocket 36 extends below the main portion of the case 26, thus necessitating the cover extension 32. The sprockets 34 and 36 are coupled together by the cog belt 38. Preferably, cog belt 38 is a high strength reinforced belt. As mentioned above, the speed reducer mechanism constituted by the sprockets 34 and 36 and belt 38 reduces the speed of the arbor shaft 22 relative to the speed of the armature 40 by a factor of approximately ¼ or 1/5.

The arbor shaft 22, preferably made of forged steel, is supported by a pair of arbor bearings 44a and 44b located below and proximate to armature bearings 42a and 42b. Thus, the armature 40 and arbor shaft 22 are preferably parallel, substantially the same length, and supported by bearings substantially the same distance apart.

The blade 20 is conventionally mounted on the end of arbor shaft 22 opposite from the end which extends into the speed reducer cover 30.

Figure 5A:
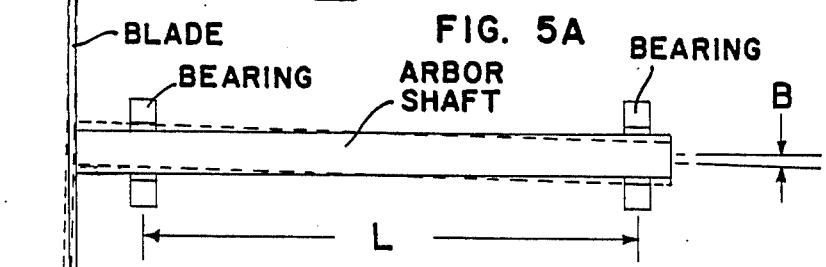
FIG. 5 is a diagrammatic illustration of saw blade deflection occasioned by arbor shaft runout for the present invention (FIG. 5A) and the prior art (FIG. 5B).
Figure 5B:
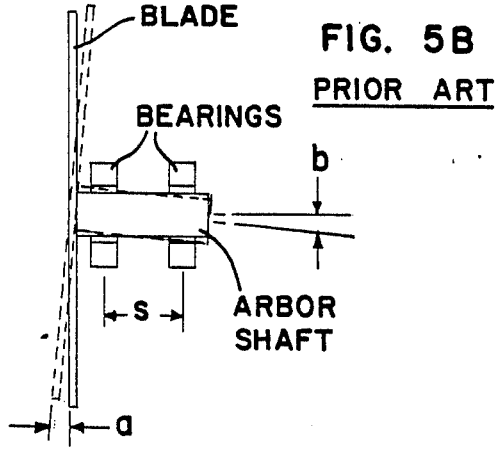

Those skilled in the art will recognize that the arbor shaft 22 is considerably longer than conventional prior art arbor shafts. This allows the arbor bearings 44 to be spaced quite some distance apart so that any play in the arbor shaft 22 associated with looseness in the bearings 44a and 44b, for example, causes little deflection of the blade 20 away from the vertical. The blade deflection caused by play in the shaft 22 is clearly shown in FIG. 5, a diagrammatic representation of blade deflection for a motor unit according to the present invention (FIG. 5A) and a prior art motor unit (FIG. 5B). FIG. 5A shows the arbor shaft 22 supported by a pair of spaced bearings wherein the distance between the bearings is labeled "L", the play in the blade is labeled "A", and the play in the arbor shaft is labeled "B". By contrast, FIG. 5B diagrammatically shows the typical prior art arbor shaft wherein the distance between the bearings is labeled "S", the blade deflection is designated "a", and the play in the arbor shaft is labeled "b". It can be seen that by spacing the bearings a distance "L" apart, the play or runout in the blade is considerably reduced. In fact, roughly speaking, the following relationship exists:

$$b/B = L/S \simeq a/A$$

That is, the play or runout in the blade is reduced substantially in direct proportion to the increase in distance between the arbor bearings. For example, the specified values are approximately as follows for a typical prior art power mitre box:

S = 1.5 inches (typically)
a = 0.010 inch runout
b = 0.002 inch runout

By contrast, a preferred power mitre box according to the invention possesses the following characteristics:

L = 7 inches (typically)
A = 0.002 inch runout (maximum)
B = 0.002 inch runout

The term "runout" as used above refers to T.I.R. or total indicated runout. Also, it should be noted that the T.I.R. of the blade of the preferred power mitre box is less than the T.I.R. of the arbor shaft due to the fact that the bearing spacing is greater than the radius of the typical 10 inch diameter blade.

While the foregoing description focuses primarily on the blade deflection problem associated with prior art power mitre boxes, preferred embodiments of the invention also increase blade utilization and ease-of-repair. FIG. 4 shows a top plan view of power mitre box 10 in its full down position. A straight cut is shown in solid lines; 45 degree mitres are illustrated in phantom. It can be seen that the speed reducer cover 30 and cover extension 32 do not in any way interfere with mitre cuts. Since power mitre boxes are very often used for mitre cuts, the design of power mitre box 10 allows for full blade utilization in contrast to power mitre boxes that have a short arbor shaft (cover extension located adjacent to blade).

Regarding the ease-of-repair factor, power mitre box 10 preferably includes a cog belt type speed reducer. If the cog belt 39 fails it can be replaced simply be removing the speed reducer cover 30. On the other hand, repair of a gear type speed reducer is usually expensive and often requires the assistance of a professional repairman.

It should be recalled, however, that the present invention is primarily directed to reducing blade deflection or wobble. In view of this, the precise lengths and relative lengths of the shafts and distances between the bearings are not critical. For example, blade deflection would be reduced if the distance between the arbor bearings 44a and 44b was at least approximately one-half the blade diameter or approximately one-third the distance between the armature bearings 42a and 42b. Stated another way, blade deflection would be significantly decreased if the length of the arbor shaft 22 were increased to at least approximately one-third the length of the armature 40. Preferably, however, the distance between the arbor bearings is at least three-quarters the distance between the armature bearings. More preferably, the distance between the arbor bearings is approximately equal to the distance between the armature bearings. These numbers are only given by way of example; the claimed concept of reducing blade deflection by increasing the distance between the arbor bearings 44a and 44b can be implemented in other ways contemplated by the invention.

It should particularly be emphasized that the Drawing only illustrates a preferred embodiment of the present invention. Other embodiments according to the invention are possible. For example, the cog belt speed reducer shown in FIG. 3 could easily be replaced by a helical gear speed reducer. Further, it is not absolutely necessary that the speed reducer be located opposite from the blade 20. That is, the blade 20 could be attached to the arbor shaft 22 near the speed reducer, as opposed to being attached to the opposite end of the arbor shaft 22 as shown in the Drawing.

It should be emphasized that the present invention is not limited to any particular components, materials or configurations, and modifications of the invention will be apparent to those skilled in the art in light of the foregoing description. This description is intended to provide a specific example of a power mitre box which clearly discloses the present invention. Accordingly, the invention is not limited to this embodiment or to the use of elements having the specific configurations and shapes as presented herein. For example, a gear type speed reducer could be used rather than a cog belt speed reducer. And, the blade 20 could be located adjacent the relatively large sprocket (or gear) rather than on the opposite end of the arbor shaft. As discussed above, however, a preferred power mitre box includes a cog belt speed reducer and has its blade and speed reducer at opposite ends of a relatively long arbor shaft. All alternative modifications and variations of the present invention which fall within the spirit and broad scope of the appended claims are included.

I claim:

1. A power saw arrangement comprising:
   (a) a base;
   (b) a table pivotably connected to said base for pivoting about a substantially vertical axis;
   (c) a circular saw blade having a first radius, and a central axis;
   (d) a motor unit pivotably connected to said table, said motor unit including: a casing; a motor armature having a longitudinal axis; an arbor shaft; a speed reducer arrangement; and, a casing extension;
      (i) said casing having a first sidewall and a second sidewall;
      (ii) said motor unit including a pair of armature bearings operatively mounted in said casing and arranged to rotatably support said armature in extension substantially between said first and second casing sidewalls;
      (iii) said motor unit including a pair of arbor bearings operatively mounted in said casing and arranged to rotatably support said arbor shaft in extension substantially between said first and second casing sidewalls;
      (iv) said arbor shaft being mounted in said arbor bearings and said armature being mounted in said armature bearings, said arbor shaft and said armature being spaced apart and extending substantially parallel to one another;
      (v) said speed reducer arrangement being mounted substantially adjacent said casing first sidewall and including means operatively coupling said armature to said arbor shaft; said casing extension being arranged to enclose said speed reducer arrangement;
      (vi) said circular saw blade being mounted on said arbor shaft substantially adjacent said casing second sidewall, and exterior to said casing;
      (vii) said saw blade being mounted relative to said armature such that a line coaxial with said armature longitudinal axis intersects said saw blade within a distance of said first radius from said saw blade central axis;
   (e) a distance between said arbor bearings being at least about one-third a distance between said armature bearings.

2. The power saw arrangement of claim 1 wherein:
   (a) said distance between said arbor bearings is at least about one-half of the distance between said armature bearings.

3. The power saw arrangement of claim 1 wherein:
   (a) said distance between said arbor bearings is about equal to a distance between said armature bearings.

4. The power saw arrangement of claim 1 wherein:
   (a) said distance between said arbor bearings is at least about 7 inches.

5. A power saw arrangement comprising:
   (a) a base;
   (b) a table pivotably connected to said base for pivoting about a substantially vertical axis;
   (c) a circular saw blade having a first radius and a central axis;
   (d) a motor unit pivotably connected to said table, said motor unit including: a casing; a motor armature having a longitudinal axis; an arbor shaft; a speed reducer arrangement; and, a casing extension;
      (i) said casing having a first sidewall and a second sidewall;
      (ii) said motor unit including a pair of armature bearings operatively mounted in said casing and arranged to rotatably support said armature in extension substantially between said first and second casing sidewalls;
      (iii) said motor unit including a pair of arbor bearings operatively mounted in said casing and arranged to rotatably support said arbor shaft in extension substantially between said first and second casing sidewalls;
      (iv) said arbor shaft being mounted in said arbor bearings and said armature being mounted in said armature bearings, said arbor shaft and said armature being spaced apart and extending substantially parallel to one another;
      (v) said speed reducer arrangement being mounted substantially adjacent said casing first sidewall and including means operatively coupling said armature to said arbor shaft; said casing extension being arranged to enclose said speed reducer arrangement;
      (vi) said circular saw blade being mounted on said arbor shaft substantially adjacent said casing second sidewall, and exterior to said casing;
      (vii) said saw blade being mounted relative to said armature such that a line co-axial with said armature longitudinal axis intersects said saw blade within a distance of said first radius from said saw blade central axis;
   (e) a distance between said arbor bearings being at least about one-half a diameter of said saw blade.

6. The power saw arrangement of claim 5 wherein:
   (a) a distance between said arbor bearings is at least about one-third of a distance between said armature bearings.

7. The power saw arrangement of claim 6 wherein:
   (a) said distance between said arbor bearings is at least about 7 inches.

8. The power saw arrangement of claim 5 wherein:
   (a) a distance between said arbor bearings is about equal to a distance between said armature bearings.

9. A power arrangement for the mounting and operation of a circular saw blade having a first radius and a first central axis; said power arrangement comprising:
   (a) a base;
   (b) a table pivotably connected to said base for pivoting about a substantially vertical axis;
   (c) a motor unit pivotably connected to the table for pivoting about a substantially horizontal axis, said motor unit including: a casing; a motor armature having a longitudinal axis; an arbor shaft having a longitudinal axis; a speed reducer arrangement; a casing extension; and, a saw blade mount;
      (i) said casing having a first sidewall and a second sidewall;
      (ii) said motor unit including a pair of armature bearings operatively mounted in said casing and arranged to rotatably support said armature in extension substantially between said first and second casing sidewalls;

(iii) said motor unit including a pair of arbor bearings operatively mounted in said casing and arranged to rotatably support said arbor shaft in extension substantially between said first and second casing sidewalls;

(iv) said arbor shaft being mounted in said arbor bearings and said armature being mounted in said armature bearings, said armature longitudinal axis and said arbor shaft longitudinal axis being spaced apart a first distance and extending substantially parallel to one another;

(v) said speed reducer arrangement being mounted substantially adjacent said casing first sidewall and including means operatively coupling said armature to said arbor shaft, said casing extension being arranged over said casing first sidewall to enclose said speed reducer arrangement;

(vi) said saw blade mount being positioned on a portion of said arbor shaft substantially adjacent said casing second sidewall, and exterior to said casing;

(d) a distance between said arbor bearings being at least about one-third a distance between said armature bearings;

(e) said first distance between said arbor shaft and armature axes being less than a first radius of a saw blade to be mounted on said blade mount;

(f) whereby a line co-axial with said armature longitudinal axis will intersect a mounted saw blade within a distance of less than the saw blade radius from the saw blade center.

10. The power arrangement of claim 9 wherein:
(a) said distance between said arbor bearings is at least about one-half of the distance between said armature bearings.

11. The power arrangement of claim 9 wherein:
(a) said distance between said arbor bearings is about equal to a distance between said armature bearings.

12. The power arrangement of claim 9 wherein:
(a) said distance between said arbor bearings is at least about 7 inches.

13. A power saw arrangement comprising:
(a) a base;
(b) a table mounted on said base;
(c) a circular saw blade;
(d) a motor unit mounted on said table, said motor unit including: a casing; a motor armature; an arbor shaft; a power transmission coupling; and, a casing extension;
 (i) said casing having first and second opposite sidewalls;
 (ii) said motor unit including a pair of armature bearings operatively mounted in said casing and arranged to rotatably support said armature in extension between said first and second casing sidewalls;
 (iii) said motor unit including a pair of arbor bearings operatively mounted in said casing and arranged to rotatably support said arbor shaft in extension between said first and second casing sidewalls;
 (iv) said arbor shaft being mounted in said arbor bearings and said armature being mounted in said armature bearings;
 (v) said power transmission coupling being constructed and arranged to transmit power from said motor armature to said arbor shaft, said power transmission coupling being positioned substantially adjacent said casing first sidewall, said casing extension being arranged to enclose said power transmission coupling;
 (vi) said circular saw blade being mounted on said arbor shaft substantially adjacent said casing second sidewall, and exterior to said casing; and
(e) a distance between said arbor bearings being at least about one-third a distance between said armature bearings.

14. The power saw arrangement of claim 13 wherein:
(a) said distance between said arbor bearings is at least about one-half of the distance between said armature 15. The power saw arrangement of claim 13 wherein:
(a) said distance between said arbor bearings is about equal to a distance between said armature bearings.

16. The power saw arrangement of claim 13 wherein:
(a) said distance between said arbor bearings is at least about 7 inches.

17. A power saw arrangement comprising:
(a) a base;
(b) a table mounted on said base;
(c) a circular saw blade;
(d) a motor unit mounted on said table, said motor unit including: a casing; a motor armature; an arbor shaft; a power transmission coupling; and, a casing extension;
 (i) said casing having first and second opposite sidewalls;
 (ii) said motor unit including a pair of armature bearings operatively mounted in said casing and arranged to rotatably support said armature in extension between said first and second casing sidewalls;
 (iii) said motor unit including a pair of arbor bearings operatively mounted in said casing and arranged to rotatably support said arbor shaft in extension between said first and second casing sidewalls;
 (iv) said arbor shaft being mounted in said arbor bearings and said armature being mounted in said armature bearings;
 (v) said power transmission coupling being constructed and arranged to transmit power from said motor armature to said arbor shaft, said power transmission coupling being positioned substantially adjacent said casing first sidewall; said casing extension being arranged to enclose said power transmission coupling;
 (vi) said circular saw blade being mounted on said arbor shaft substantially adjacent said casing second sidewall and exterior to said casing; and
(e) a distance between said arbor bearings being at least about one-half of diameter of said circular saw blade.

18. The power saw arrangement of claim 17 wherein:
(a) a distance between said arbor bearings is at least about one-third of a distance between said armature bearings.

19. The power saw arrangement of claim 18 wherein:
(a) a distance between said arbor bearings is at least about 7 inches.

20. The power saw arrangement of claim 17 wherein:
(a) a distance between said arbor bearings is about equal to a distance between said armature bearings.

21. A power arrangement for mounting a circular saw blade, said power arrangement comprising:
(a) a base;
(b) a table mounted on said base;
(c) a motor unit mounted on said table, said motor unit including: a casing, a motor armature, an arbor shaft; a power coupling; a casing extension; and, a saw blade mount;
 (i) said casing having first and second opposite sidewalls;
 (ii) said motor unit including a pair of armature bearings operatively mounted in said casing and arranged to rotatably support said armature in extension between said first and second casing sidewalls;
 (iii) said motor unit including a pair of arbor bearings operatively mounted in said casing and arranged to rotatably support said arbor shaft in extension between said first and second casing sidewalls;
 (iv) said arbor shaft being mounted in said arbor bearings and said armature being mounted in said armature bearings;
 (v) said power transmission coupling being constructed and arranged to transmit power from said motor armature to said arbor shaft, said power transmission coupling being positioned substantially adjacent said casing first sidewall; said casing extension being arranged to enclose said power transmission coupling;
 (vi) said saw blade mount being positioned on said arbor shaft substantially adjacent said casing second sidewall and exterior to said casing; and
(d) a distance between said arbor bearings being at least about one-third of a distance between said armature bearings.

22. The power arrangement of claim 21 wherein:
(a) said distance between said arbor bearings is at least about one-half of the distance between said armature bearings.

23. The power arrangement of claim 21 wherein:
(a) said distance between said arbor bearings is about equal to a distance between said armature bearings.

24. The power arrangement of claim 21 wherein:
(a) said distance between said arbor bearings is at least about 7 inches.

* * * * *